USO05392883A

United States Patent [19]
Huang et al.

[11] Patent Number: 5,392,883
[45] Date of Patent: Feb. 28, 1995

[54] CONTROLLABLE HYDRAULIC VIBRATION DAMPENER

[75] Inventors: Zhen Huang, Wuppertal; Klaus Schmidt, Bergisch Gladbach, both of Germany

[73] Assignee: August Bilstein GmbH & Co. KG, Ennepetal, Germany

[21] Appl. No.: 154,815

[22] Filed: Nov. 19, 1993

[30] Foreign Application Priority Data

Nov. 21, 1992 [DE] Germany .............................. 4239160

[51] Int. Cl.$^6$ ......................... B60G 17/08; F16F 9/46
[52] U.S. Cl. ..................................... 188/282; 188/299
[58] Field of Search ................. 188/279, 281, 282–285, 188/299, 312, 313, 314–316, 317, 322.15, 319; 251/38

[56] References Cited

U.S. PATENT DOCUMENTS

| | | | |
|---|---|---|---|
| 4,497,394 | 2/1985 | Ferrand et al. | 188/282 |
| 4,620,619 | 11/1986 | Emura et al. | 188/282 X |
| 4,958,704 | 9/1990 | Leiber et al. | 188/285 |
| 5,078,240 | 1/1992 | Ackermann et al. | 188/285 |
| 5,207,300 | 5/1993 | Engel et al. | 188/282 X |

FOREIGN PATENT DOCUMENTS

| | | |
|---|---|---|
| 2355210 | 1/1978 | France .............................. 188/282 |
| 3835705 | 4/1990 | Germany . |
| 4216987 | 7/1993 | Germany . |

*Primary Examiner*—Robert J. Oberleitner
*Assistant Examiner*—Peter M. Poon
*Attorney, Agent, or Firm*—Max Fogiel

[57] ABSTRACT

A regulable hydraulic dashpot for motor vehicles. It features a shock-absorbing piston (1) and a shock-absorbing cylinder (2). The piston travels into and out of the cylinder on a rod (21). The piston divides the cylinder into two hydraulics compartments (3 & 4). The piston accommodates constrictions that incorporate pressure-sensitive valves (26 & 27). The piston has at least one bypass port. A system of (34) of electromagnetically operated valves reroutes the bypass ports in accordance with whether the dashpot is in the suction state or the compression phase. The object is continuous regulation of the level of shock absorption in a dashpot, rapid response to frequent actuation, an easy-to-establish base line, and a simple design. A slide-valve bolt (13) is associated with the routing (5, 9, 10, & 6) of the bypass during the suction phase. Another slide-valve bolt (14) is associated with its routing (6, 8, and 7) during the compression phase. Each slide-valve bolt is subject to a spring (11 & 12) that forces it to maintain the bore closed. The bolts accommodate pilot reservoirs (15 & 16) that are provided with hydraulic fluid through a port in the bolt from whichever hydraulics compartment is pressurized. The pilot reservoirs communicate through a hydraulic-fluid line (17). The line can be opened and closed to various extents by an electromagnetically controlled bolt (18). Fluid flows out of the pilot reservoir in whichever slide-valve bolt is subjected to pressure through the port in whichever slide-valve bolt is not subjected to pressure.

10 Claims, 5 Drawing Sheets

CONTROLLABLE HYDRAULIC VIBRATION DAMPENER

BACKGROUND OF THE INVENTION

The present invention concerns a regulable hydraulic dashpot for motor vehicles. The dashpot has a shock-absorbing piston and a shock-absorbing cylinder. The piston travels into and out of the cylinder on a rod. It divides the cylinder into two hydraulics compartments. The piston accommodates constrictions that incorporate pressure-sensitive valves. The piston also has at least one bypass port. A system of electromagnetically controlled valves reroutes the bypass ports in accordance with whether the dashpot is in the suction state or the compression phase.

A dashpot of this genus is known from German Application P 4 216 987. The bypass is rerouted by two electromagnetically operated valves. Each pressure-sensitive valve communicates in parallel or in series with an electromagnetically controlled bolt. The electromagnetically controlled bolts travel into and out of a bore. Such a dashpot allows graduated regulation of absorption in both the suction and compression phase in accordance with four performance parameters.

Another dashpot is known from German OS 3 835 705 A1. The level of absorption can be varied force-proportionally independent of the piston's speed. The piston accommodates for this purpose two isolated valves. The second valve accommodates a fluid reservoir. The level of pressure exerted on the plunger in the second valve by the fluid in the reservoir can be varied by the first valve, which is electromagnetically controlled. The base line, however, is difficult to establish when the electromagnet is off. Another drawback is that valves that are required to generate such a high level of absorption so often react slowly if at all due to the time needed to establish pressure in the reservoir.

SUMMARY OF THE INVENTION

The object of the present invention is a system of electromagnetically controlled valves that can continuously regulate the level of absorption in a dashpot, that will respond rapidly to frequent actuation, that will exhibit an easy-to-establish base line, and that will be simple in design.

A slide-valve bolt is accordingly associated with each bore in the bypass during the suction phase and during the compression phase. The bolt keeps the bore closed subject to a spring. The bolts accommodate pilot reservoirs. Hydraulic fluid is provided to the pilot reservoirs through a port in the bolt from the pressurized hydraulics compartment. The pilot reservoirs communicate through a hydraulic-fluid line, The line can be opened and closed to various extents by an electromagnetically controlled bolt. Fluid flows in accordance with one particularly significant feature of the invention out of the pilot reservoir in whichever slide-valve bolt is subjected to pressure through the port in whichever slide-valve bolt is not subjected to pressure.

The ports in the slide-valve bolt that are upstream of the pilot reservoir are narrower than the downstream ports. A desired dashpot-performance curve can be plotted for the particular electromagnetically controlled bolt that represents the pilot reservoir.

The same feature is attained in one advantageous embodiment of the invention in that the slide-valve bolts have one-way valves that partly obstruct the bolt's ports upstream of one of the hydraulics compartments.

The system of electromagnetically controlled valves in another advantageous embodiment obstructs the line between the pilot reservoirs for the suction phase and for the compression phase when the system of electromagnets is off in order to ensure that the bypass port will remain closed in the absence of current and the shock-absorbing force will be maintained only by the pressure-sensitive throttle valves in the piston.

The system of electromagnetically controlled valves in accordance with the invention can be positioned in the cylinder and above the piston. It can also be a separate component positioned outside the cylinder with at least one line between the hydraulics compartments or between one hydraulics compartment and a compensation chamber 24.

When the system of electromagnetically controlled valves is employed to regulate the level of shock absorption in a dashpot, one of the hydraulics compartments in the cylinder will communicate with an external source of pressure through the system.

The dashpot in accordance with the invention allows continuing adjustment of the level of shock absorption. It will also respond more reliably, due to the bypass-valve system and to the redundant one-way valve in the channels upstream of the system of electromagnetically controlled valves, to frequent actuation.

The forces applied by the electromagnets are relatively weak because they affect only how much force the electromagnetically controlled bolt requires in order to close the actual bypass valve by varying the pressure on the slide-valve bolts.

BRIEF DESCRIPTION OF THE DRAWINGS

Embodiments of the invention will now be specified by way of example with reference to the accompanying drawing, wherein.

DESCRIPTION OF THE PREFERRED EMBODIMENTS

Figure 1:
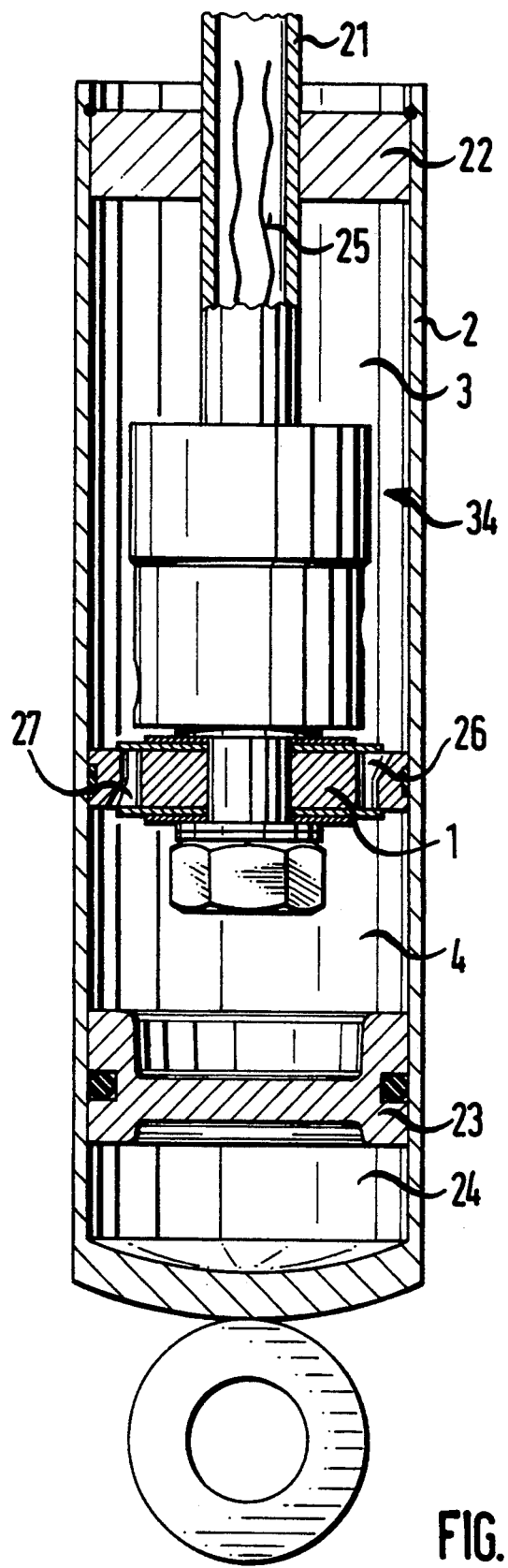
FIG. 1 is a schematic illustration of a one-cylinder dashpot.

The regulable one-cylinder hydraulic dashpot illustrated in FIG. 1 essentially comprises a shock-absorbing system consisting of a piston 1 and a cylinder 2. There is a cap 22 over one end of cylinder 2. A hollow piston rod 21 extends into the cylinder through cap 22. Piston 1 is mounted inside the cylinder on the end of rod 21 and divides the cylinder into two hydraulic compartments 3 and 4. Lower compartment 4 terminates at the bottom in a partition 23. On the other side of partition 23 is a gas-filled chamber 24 that compensates for the volume of piston rod 21 as it travels in and out. Piston 1 accommodates a proportionally regulated system 34 of electromagnetically controlled valves. Electric-current supply lines 25 extend out of each control valve and through piston rod 21.

Figure 2:
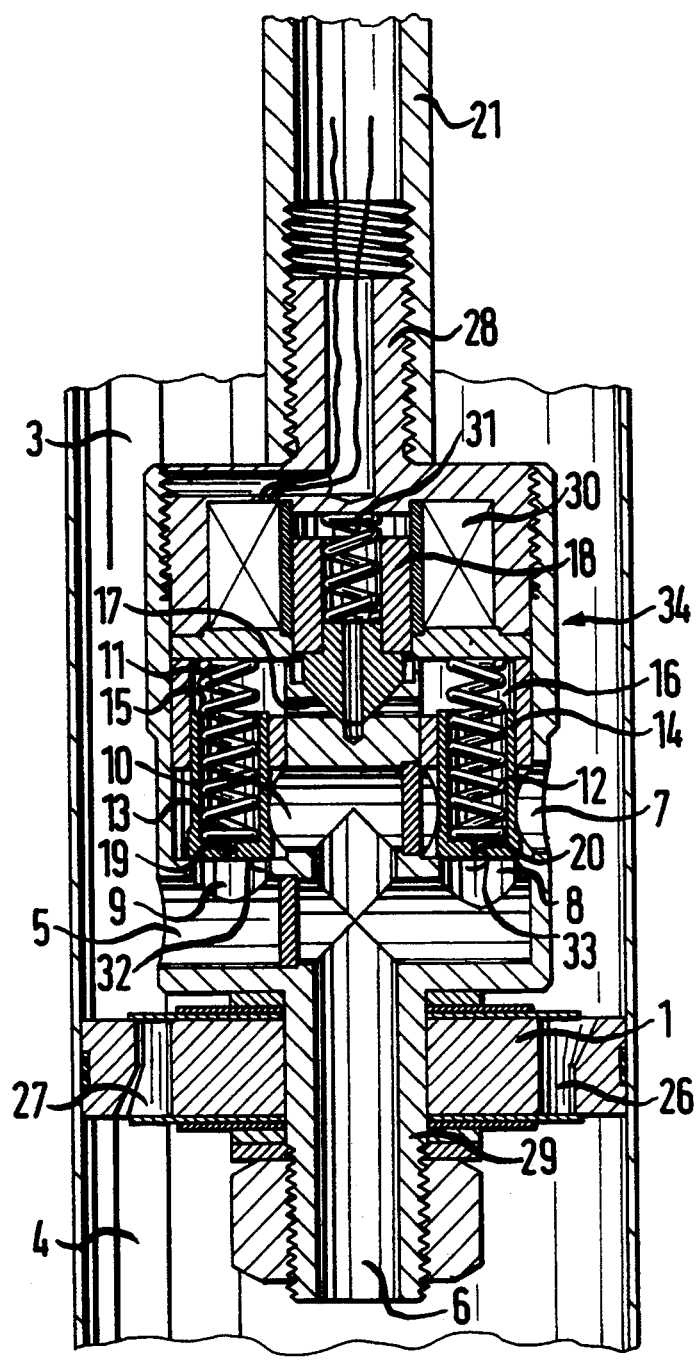
FIG. 2 illustrates a system of electromagnetically controlled valves intended for use inside the cylinder.

FIG. 2 illustrates one embodiment of the system 34 of electromagnetically controlled valves illustrated in FIG. 1. It is accommodated in a valve housing 28 between piston 1 and piston rod 21, which it screws onto the end of.

System 34 of electromagnetically controlled valves accommodates two hollow slide-valve bolts 13 and 14. Bolt 13 governs suction-phase bypass channel 5, 9, 10, and 6. Bolt 14 governs compression-phase bypass channel 6, 8, and 7. The bolts are subject to springs, bolt 13 to a spring 11 and bolt 14 to a spring 12, that force them to maintain the channel closed. Accommodated above slide-valve bolts 13 and 14 in valve housing 28 is a solenoid comprising a coil 30 and a core in the form of a bolt 18 that slides in and out of the coil. A spring 31 forces the electromagnetically controlled bolt 18 to maintain the channel closed as long as coil 30 is off.

Slide-valve bolts 13 and 14 accommodate pilot reservoirs 15 and 16 that differentially generate enough force to counteract the pressure established in hydraulics compartments 3 and 4. Chamber 15 operates in conjunction with upper compartment 3 and chamber 16 with lower compartment 4. Pilot reservoirs 15 and 16 communicate through a hydraulic-fluid line 17. How far line 17 is open is controlled by electromagnetically controlled bolt 18.

When the dashpot is in the suction phase, hydraulic fluid will flow into lower hydraulics compartment 4 through pressure-sensitive throttle valve 26 and will simultaneously be available in front of slide-valve bolt 13 by way of a port 5. Fluid will flow into pilot reservoir 15 through a port 19. The pressure in chamber 15 will accordingly, as long as electromagnet coil 30 is off, rise to the level of the pressure prevailing in upper hydraulics compartment 3. Spring 11 meanwhile is forcing slide-valve bolt 13 into valve seat 32. When on the other hand electromagnetically controlled bolt 18 opens hydraulic-fluid line 17 to a greater or lesser extent, fluid will flow out through a port 20 in the unpressurized slide-valve bolt 14 and through ports 8 and 6. The force generated by the pressure of the fluid in upper hydraulics compartment 3 will be able to overcome the force of spring 11. Slide-valve bolt 13 will lift out of valve seat 32 to an extent commensurate with how wide hydraulic-fluid line 17 is open and hence with the pressure prevailing in pilot reservoir 15, opening suction-phase bypass channel 5, 9, 10, and 6 more or less wide.

When the dashpot is operating in the compression phase, fluid will leave the pressurized lower hydraulics compartment 4 by way of ports 6 and 8 in the face of slide-valve bolt 14 and flow into pilot reservoir 16, where the pressure will equal the pressure in lower hydraulics compartment 4 as long as hydraulic-fluid line 17 is blocked. When electromagnet coil 30 is on, electromagnetically controlled bolt 18 will open hydraulic-fluid line 17 to a greater or lesser extent and the fluid will flow out of pilot reservoir 16 and into the unpressurized pilot reservoir 15 and, through port 20, into upper hydraulics compartment 3. The pressure in pilot reservoir 16 will be lower than that in lower hydraulics compartment 4. Slide-valve bolt 14 will accordingly lift out of valve seat 33 against the force of spring 12, opening compression-phase bypass channel 6, 8, and 7 more or less wide.

Figure 3:
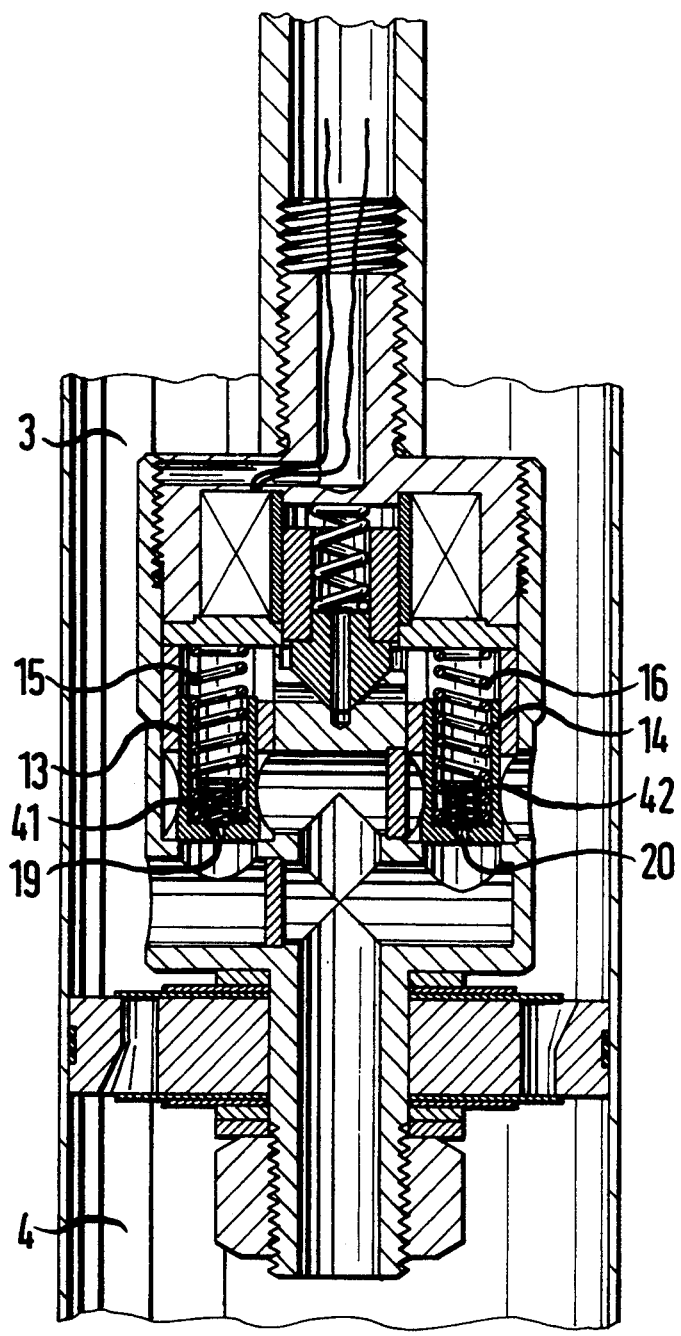
FIG. 3 illustrates a system with different ports in the valve bolts that vary upstream and downstream.

It can be of advantage in order to plot a precise performance curve for the ports 19 and 20 in slide-valve bolts 13 and 14 to be narrower upstream in terms of the fluid flowing out of hydraulics compartment 3 or 4 than downstream in terms of the fluid flowing out of pilot reservoir 16 or 15. The differentiation in width can be obtained by means of the one-way valves 41 and 42 illustrated in FIG. 3. One-way valve 41 is accommodated in slide-valve bolt 13 and one-way valve 42 in slide-valve bolt 14. These valves to some extent close off ports 19 and 20 as the fluid flows in.

Figure 4:
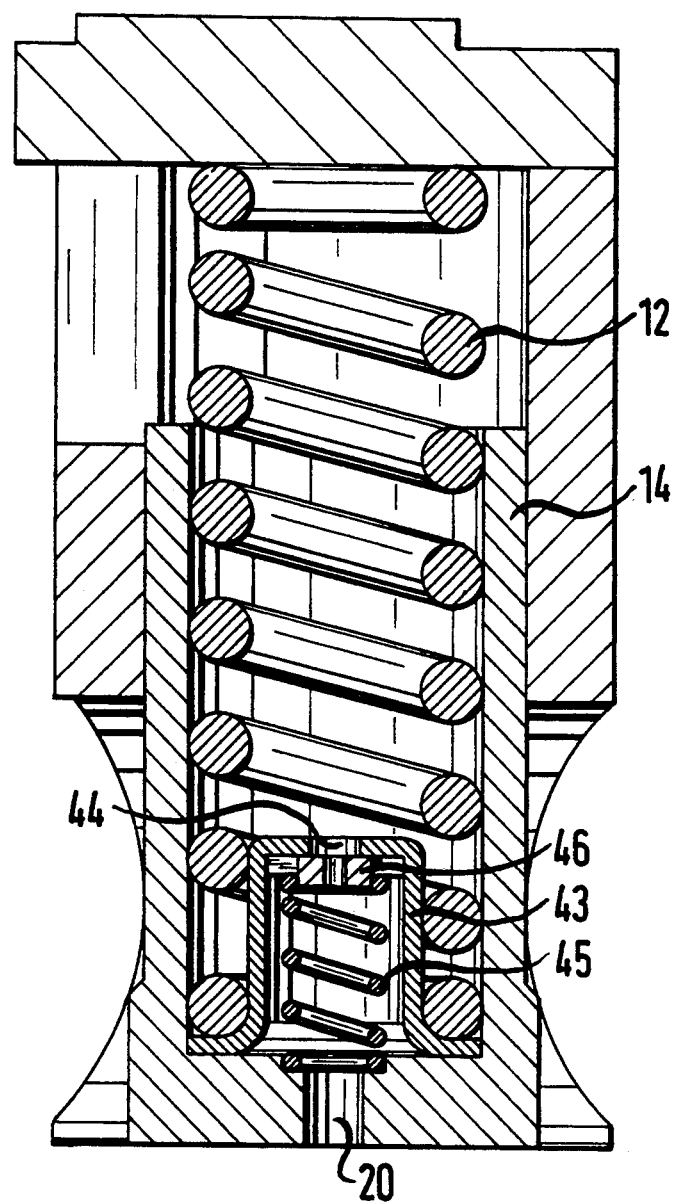
FIG. 4 illustrates one type of valve bolt.

FIG. 4 illustrates an embodiment of the one-way valve in slide-valve bolt 14 by way of example. Slide-valve bolt 14 is shaped like a shotgun cartridge and subject to the force of spring 12. Positioned over its port 20 is a structure in the shape of an inverted cup 43 with a port 44 in the base. Inside cup 43 is a gasket 46 that blocks off part of port 44 and is tensioned in the direction of incoming fluid by a spring 45. The desired performance curve can be obtained by varying the dimensions of the various ports in the slide-valve bolts in accordance with the design of the pilot reservoir (electromagnetically controlled bolt 18).

Figure 5:
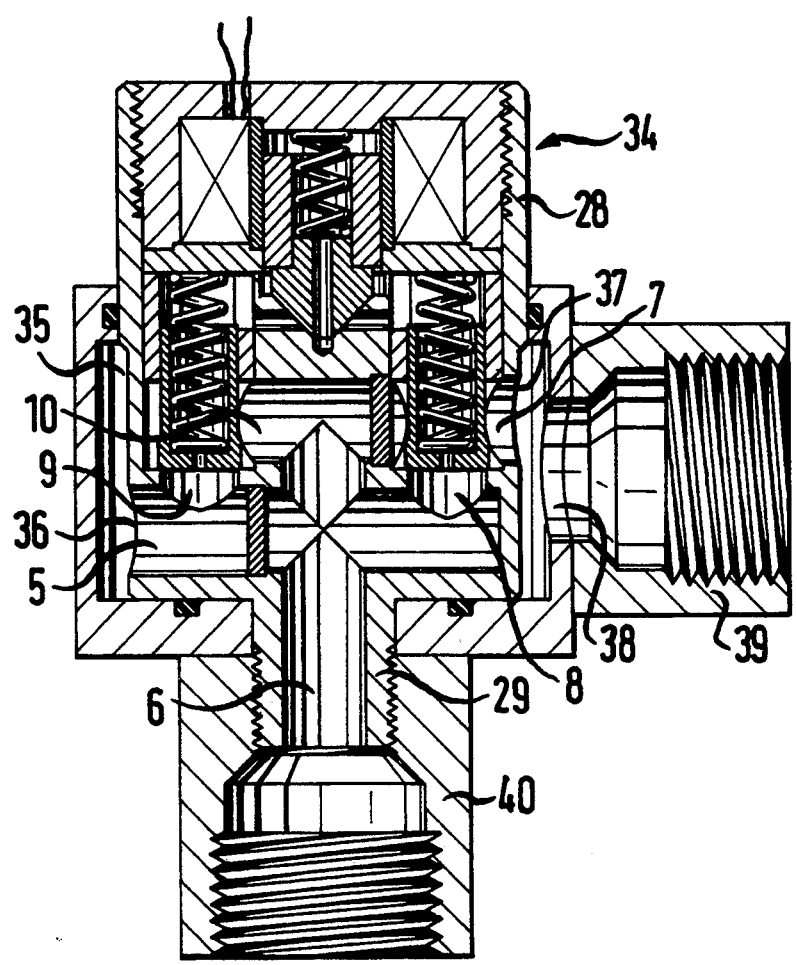
FIG. 5 illustrates a system of electromagnetically controlled valves intended for use as a separate component outside the dashpot.

FIG. 5 illustrates system 34 of electromagnetically controlled valves as a separate component. The entrance 36 into suction-phase bypass channel 5, 9, 10, and 6 and the exit 37 out of compression-phase bypass channel 6, 8, and 7 open into a gap 35 that surrounds valve housing 28 and is sealed off from the environment. Gap 35 communicates through an aperture 38 and a connector 39 with one of the dashpot's hydraulics compartments. Communication with the other compartment is provided through a neck 29 that fits into another connector 40.

When the system of electromagnetically controlled valves is employed with a two-cylinder dashpot it is of advantage for one connector to communicate through a line with the hydraulics compartment above the piston and the other with the compensation chamber.

We claim:

1. A regulable hydraulic dashpot for motor vehicles, comprising: a shock-absorbing piston and a shock-absorbing cylinder, said piston traveling into and out of said cylinder on a rod, said piston dividing said cylinder into two hydraulic compartments accommodating constrictions that incorporate pressure-sensitive valves, and having at least one bypass port; a system of electromagnetically operated and electromagnetically controlled valves rerouting said at least one bypass port in accordance with whether the dashpot is in a suction state or in a compression phase; a slide-valve bolt associated with routing of said bypass during said suction phase and another slide-valve bolt associated with routing during the compression phase; a spring forcing each slide-valve bolt to maintain the bolt closed, the bolts accommodating pilot reservoirs provided with hydraulic fluid through a port in the bolt from whichever hydraulic compartment is pressurized, said pilot reservoirs communicating through a hydraulic-fluid line that can be opened and closed to various extents by an electromagnetically controlled bolt, fluid flowing out of the pilot reservoir in whichever slide-valve bolt is subjected to pressure through the port in whichever slide-valve bolt is not subjected to pressure.

2. A dashpot as defined in claim 1, wherein said at least one bypass port comprises two ports in said slide-valve bolts, said ports having ports upstream of said pilot reservoirs and downstream ports, said upstream ports being narrower than said downstream ports.

3. A dashpot as defined in claim 2, wherein said slide-valve bolts have one-way valves obstructing partly the upstream ports that are upstream of one of said hydraulic compartments.

4. A dashpot as defined in claim 1, wherein said system of electromagnetically operated and electromagnetically controlled valves has electromagnets comprising a proportional magnet.

5. A dashpot as defined in claim 1, wherein said electromagnetically controlled bolt comprises a core of a solenoid.

6. A dashpot as defined in claim 5, wherein said electromagnetically controlled bolt blocks said hydraulic-fluid line as long as the solenoid is off.

7. A dashpot as defined in claim 1, wherein said system of electromagnetically controlled valves is in said cylinder and above said piston.

8. A dashpot as defined in claim 1, wherein said system of electromagnetically controlled valves is outside said cylinder and communicates through a hydraulic-fluid line with said hydraulic compartments.

9. A dashpot as defined in claim 1, wherein said system of electromagnetically controlled valves opens and closes said bypass and one of said hydraulic compartments in said cylinder communicates through said bypass with a compensation chamber.

10. A dashpot as defined in claim 1, wherein one of said hydraulic compartments can regulably communicate with an external reservoir of compressed hydraulic fluid through said system of electromagnetically controlled valves.

* * * * *